United States Patent
Malmborg et al.

(10) Patent No.: US 8,331,703 B2
(45) Date of Patent: Dec. 11, 2012

(54) PARALLEL IMAGE ENCODING

(75) Inventors: Lars Ingvar Malmborg, Lund (SE); Reimar Gisbert Döffinger, Lund (SE)

(73) Assignee: ARM Limited, Cambridge (GB)

( * ) Notice: Subject to any disclaimer, the term of this patent is extended or adjusted under 35 U.S.C. 154(b) by 114 days.

(21) Appl. No.: 12/929,847

(22) Filed: Feb. 18, 2011

(65) Prior Publication Data

US 2012/0213448 A1 Aug. 23, 2012

(51) Int. Cl.
 G06K 9/36 (2006.01)
 G06K 9/46 (2006.01)
(52) U.S. Cl. .................................. 382/232
(58) Field of Classification Search ............ 382/232, 382/233, 240; 341/50, 59, 67, 76, 94; 375/240.01, 375/240.04, 240.12, 240.16
See application file for complete search history.

(56) References Cited

U.S. PATENT DOCUMENTS

| | | | | |
|---|---|---|---|---|
| 4,684,921 A | * | 8/1987 | Fok et al. | 341/59 |
| 5,929,914 A | * | 7/1999 | Normand | 375/240.04 |
| 6,433,708 B1 | * | 8/2002 | Eiderman et al. | 341/50 |
| 6,847,684 B1 | * | 1/2005 | Hsu | 375/240.16 |
| 7,120,196 B2 | * | 10/2006 | Yu et al. | 375/240.12 |
| 2006/0256867 A1 | * | 11/2006 | Turaga et al. | 375/240.16 |

OTHER PUBLICATIONS

JPEG, "A photo of a flower compressed with successively more lossy compression ratios from left to right", pp. 1-23, 2008.

Castells-Rufas, David et al., "Scalability of a Parallel JPEG Encoder on Shared Memory Architectures", (2010), 39th International Conference on Parallel Processing, pp. 502-507, 2010.

* cited by examiner

Primary Examiner — Amir Alavi
(74) Attorney, Agent, or Firm — Nixon & Vanderhye P.C.

(57) ABSTRACT

An image encoding apparatus is configured to encode image data comprising a sequence of unencoded blocks of pixels into a sequence of encoded blocks of pixels in a predetermined image encoding format. Each encoded block of pixels has a characteristic encoding value representative of its corresponding unencoded block of pixels, and a plurality of dependently encoded blocks of pixels each have a dependent characteristic encoding value which is defined with reference to the characteristic encoding value for a preceding encoded block of pixels. The image encoding apparatus comprises a first encoding unit configured to perform an encoding process on a first group of the unencoded blocks of pixels and a second encoding unit configured to perform the encoding process on a second group of the unencoded blocks of pixels, wherein the encoding process generates an encoded block of pixels in the predetermined image encoding format, and wherein the second group immediately follows the first group and a first block of the second group is comprised in the plurality of dependently encoded blocks of pixels. The first encoding unit and the second encoding unit are configured to perform the encoding process in parallel on respective unencoded blocks of pixels in the first group and in the second group on a block-by-block basis. The image encoding apparatus is configured to perform a characteristic encoding value determination operation to determine the characteristic encoding value for a last block of pixels in the first group, before determining the dependent characteristic encoding value for the first block of the second group.

25 Claims, 9 Drawing Sheets

PARALLEL IMAGE ENCODING

BACKGROUND OF THE INVENTION

1. Field of the Invention

The present invention relates to encoding image data according to a predetermined image encoding format. More particularly, this invention relates to image encoding apparatuses comprising more than one encoding unit, wherein the encoding units are configured to perform the encoding process in parallel.

2. Description of the Prior Art

It is known to provide an image encoding apparatus configured to encode image data according to a predetermined image encoding format. For example, it is known to provide an encoding apparatus which is configured to receive image data in a raw format (e.g. RGB or YUV) and to encode the image data according to a predetermined image encoding format such as those formats defined by the Joint Photographic Experts Group, commonly referred to generically as the JPEG format.

Image encoding formats such as JPEG can enable a significant reduction in the file size of image data without significant visible loss of image quality. Indeed, a data size reduction by a factor of 10 is commonly achievable without a loss of quality perceivable to the human eye.

The particular techniques involved in encoding image data according to image encoding formats such as JPEG are familiar to the person skilled in the art and are not described in detail herein. However, one particular aspect of the encoding process which is of relevance in the present context is the dependent encoding of a block of pixels within the image data with respect to a preceding block of pixels. For example, in the JPEG encoding format, the DC coefficient (average pixel value) of a block of pixels will commonly be defined with respect to the DC coefficient of the previous block of pixels. Because of the spatial correlation between blocks of pixels, i.e. a given block of pixels is likely to have similar pixel values to the preceding block of pixels, a data size reduction can be achieved when the difference to be encoded is relatively small.

It is also known to parallelize data processing tasks which comprise multiple sub-tasks. For example, several data processing units may be provided which are capable of performing those sub-tasks and the processing load of performing the data processing task is sub-divided between the multiple data processing units by allocating one or more sub-tasks to each of them. If the sub-tasks can be performed in parallel by the multiple data processing units, this parallelization of the data processing task can mean that the time required for it to be carried out can be greatly reduced by virtue of the multiple data processing units operating in parallel to one another.

However, the process of encoding image encoding formats such as JPEG, in which many blocks of image data within a given picture are encoded with respect to the block of image data which precedes them, is not easily adapted to such parallelization, since the encoding is by its nature sequential, each block in a chain of blocks requiring the previous block to be encoded in order to be encoded itself in dependence thereon.

Some aspects of the parallelization techniques which have previously been applied to JPEG encoding are discussed in "Scalability of a Parallel JPEG Encoder on Shared Memory Architectures", D. Castells-Rufas et al., 2010 39th International. Conference on Parallel Processing. This paper reviews existing algorithmic approaches to the parallelization of the JPEG encoding process, in particular one in which the DCT transform process (inter alia) is parallelized followed by a combined, serial Huffmann encoding process. A technique is then described which seeks to parallelize the Huffmann encoding process. However, on the one hand this approach suffers from the disadvantage that a large quantity of intermediate data is generated by the first parallelized steps, which places significant demands on the system in terms of buffer capacity and memory bandwidth. Such demands are particularly undesirable in the context of systems with limited resources. On the other hand the technique described also suffers from inherent image degradation as can be seen in FIGS. 6 and 7 therein.

Accordingly, it would be desirable to provide an improved technique for encoding image data according to a predetermined image encoding format, wherein both the above described data size reduction advantages of block-to-block dependent encoding, and the above described advantages of data processing parallelization, could both be realised without generating undesirably large quantities of intermediate data and without a necessary image degradation.

SUMMARY OF THE INVENTION

Viewed from a first aspect the present invention provides an image encoding apparatus configured to encode image data comprising a sequence of unencoded blocks of pixels into a sequence of encoded blocks of pixels in a predetermined image encoding format, wherein each encoded block of pixels has a characteristic encoding value representative of its corresponding unencoded block of pixels, and wherein a plurality of dependently encoded blocks of pixels in said sequence each have a dependent characteristic encoding value which is defined with reference to the characteristic encoding value for a preceding encoded block of pixels, the image encoding apparatus comprising: a first encoding unit configured to perform an encoding process on a first group of said unencoded blocks of pixels and a second encoding unit configured to perform said encoding process on a second group of said unencoded blocks of pixels, wherein said encoding process generates an encoded block of pixels in said predetermined image encoding format, wherein said second group immediately follows said first group and a first block of said second group is comprised in said plurality of dependently encoded blocks of pixels, wherein said first encoding unit and said second encoding unit are configured to perform said encoding process in parallel on respective unencoded blocks of pixels in said first group and in said second group on a block-by-block basis, and wherein said image encoding apparatus is configured to perform a characteristic encoding value determination operation to determine said characteristic encoding value for a last block of pixels in said first group, before determining said dependent characteristic encoding value for said first block of said second group.

Accordingly, an image encoding apparatus is provided which comprises a first encoding unit and a second encoding unit each arranged to perform an encoding process on selected unencoded blocks of pixels which the image encoding apparatus receives. The predetermined image encoding format according to which the image encoding apparatus encodes the sequence of encoded blocks of pixels which it generates, is one in which each encoded block of pixels has a characteristic encoding value which is representative of the corresponding unencoded block of pixels which that encoded block represents. For example, the predetermined image encoding format may be a JPEG image encoding format and the characteristic encoding value may be a DC coefficient. Furthermore, a plurality of the encoded blocks of pixels generated by the image encoding apparatus are dependently encoded blocks of pixels wherein the characteristic encoding value is a dependent characteristic encoding value defined with reference to the characteristic encoding value for the preceding encoding block of pixels. In the example where the predetermined image encoding format is a JPEG image encoding format and the characteristic encoding value is a DC coefficient, a relative DC coefficient of a dependently encoded block of pixels may be defined as an offset from the absolute DC coefficient value for the preceding encoded block of pixels.

The presence of a plurality of dependently encoded blocks of pixels in the sequence, although beneficial for encoding efficiency, has hitherto been a significant impediment to the parallelization of the encoding process, because of the sequential nature of these dependencies. For example, in an image encoded according to the JPEG encoding format, wherein each sub-block within the image is encoded with a relative DC coefficient defined relative to the previous sub-block in the traditional raster scan sequence, the sub-division of the encoding task between more than one encoding unit has not been able to benefit from the advantages of parallel operation of these encoding units, since the encoding of the sequence is necessarily sequential.

However, the inventors of the present invention realised that the desired parallelization using more than one encoding unit could be achieved by virtue of a characteristic encoding value determination operation which splits up the sequential nature of the dependent encoding, and allows significant parallelization between the encoding units to be achieved. According to the technique of the present invention, a first encoding unit is configured to perform the encoding process on a first group of the unencoded blocks of pixels and a second encoding unit is configured to perform the encoding process on a second group of the unencoded blocks of pixels. This second group immediately follows the first group, and furthermore a first block of the second group is a dependently encoded block of pixels, i.e. the characteristic encoding value of the first block of the second group is a dependent characteristic encoding value defined with reference to the encoding value for the last block of the first group.

This dependency between the first and second group would previously have meant that the first group of unencoded blocks of pixels would have to be encoded before the encoding process on the second group of an encoded block of pixels could be started. However, the image encoding apparatus is configured to perform a characteristic encoding value determination operation to determine the characteristic encoding value for a last block of pixels in the first group, before determining the dependent characteristic encoding value for the first block of the second group. For example, when the image encoding format is a JPEG image encoding format and the characteristic encoding value is a DC coefficient, the characteristic encoding value determination operation is carried out to determine the DC coefficient (in absolute terms) for the last block of pixels in the first group, before determining the relative DC value for the first block of the second group. Hence, by performing this characteristic encoding value determination operation, the characteristic encoding value for the last block of pixels in the first group is then already available, before the dependent characteristic encoding value for the first block of the second group needs to be determined.

Thus, the first encoding unit and the second encoding unit are then able to perform the encoding process in parallel on the respective unencoded blocks of pixels in the first group and in the second group, the encoding process in each encoding unit being carried out on a block-by-block basis. In other words, each encoding unit precedes block-by-block through its respective group of unencoded blocks of pixels, performing the encoding process on each block in turn. Accordingly, parallelization of the encoding process is achieved in that the first and second encoding units perform the encoding process on the first and second group in parallel with one another, whilst the characteristic encoding value determination operation which determines the (absolute) characteristic encoding value for the last block of pixels in the first group enables the encoding dependency between the first group and second group to be broken. Furthermore, by handling the encoding process in this block-by-block fashion, the quantities of intermediate format data which must be handled by the encoding units are relatively limited, avoiding the need for large storage capacity or high memory bandwidth capacity.

Whilst the first block of pixels in the second group has a dependent characteristic encoding value defined with reference to the characteristic encoding value for the last block of pixels in the first group, it may be the case that the first block of the first group also has a dependent characteristic encoding value defined with reference to the characteristic encoding value for a preceding encoded block of pixels. Thus, in one embodiment said first group is immediately preceded by a preceding group, and said image encoding apparatus is further configured to perform said characteristic encoding value determination operation to determine said characteristic encoding value for a last block of pixels in said preceding group, before determining said dependent characteristic encoding value for said first block of said first group. Hence, the characteristic encoding value determination operation also determines the characteristic encoding value for the last block of pixels in the preceding group, thus enabling the dependent characteristic encoding value for the first block of the first group to thereafter be determined.

The first and second encoding unit may be configured to iteratively process the image data, operating on a selected first and second group of unencoded blocks of pixels at each iteration, and in one embodiment said preceding group has previously been encoded by said second encoding unit.

The image encoding apparatus may be configured to further parallelize the encoding process by being arranged with more than two encoding units configured to perform the encoding process in parallel on respective unencoded blocks of pixels, and in one embodiment the image encoding apparatus further comprises a further encoding unit configured to perform said encoding process on a further group of said unencoded blocks of pixels, wherein said further group immediately follows said second group, wherein said further encoding unit is configured to perform said encoding process on respective unencoded blocks of pixels in said further group in parallel with said first and second encoding units, and wherein said image encoding apparatus is configured to perform said characteristic encoding value determination operation to determine said characteristic encoding value for a last block of pixels in said second group, before determining said dependent characteristic encoding value for said first block of said further group.

Accordingly, the characteristic encoding value determination operation comprises determining the characteristic encoding value for a last block of pixels in both the first group and in the second group to thus allow the dependent characteristic encoding value for the first block of the second group and further group respectively to be determined. Of course, the invention is not limited to only one further encoding unit, and any number of further encoding units could be provided configured to perform the encoding process on a respective further group of the unencoded blocks of pixels, each further group of pixels immediately following the preceding group of pixels. Indeed, the image encoding apparatus could for example be arranged such that an entire frame of image data could be sub-divided into a number of groups of unencoded blocks of pixels, each group being allocated to a corresponding encoding unit.

It should be appreciated that the first and second encoding unit of the image encoding apparatus may be closely physically associated with one another, for example in one embodiment said first and second encoding unit are provided on a single processor core. Alternatively, the first and second encoding unit may be more physically separated, and in one embodiment said first and second encoding unit are provided on separate processor cores in a multi-core system. The same possibilities also exist when more than two encoding units are provided, it being possible for these multiple encoding units to be arranged on a single processor core, or distributed in a number of different ways across a multi-core system.

The image encoding apparatus may be configured to perform the characteristic encoding value determination operation in various ways. In some embodiments said characteristic encoding value determination operation is performed as a pre-processing operation in which said characteristic encoding value for said last block of pixels in said first group is determined, said pre-processing operation being performed before said second encoding unit begins said encoding process on said second group. Accordingly, before the first encoding unit and second encoding unit perform the encoding process on the first group and second group respectively, a pre-processing operation is carried out in which the characteristic encoding value for the last block of pixels in the first group is determined. Thus, the characteristic encoding value for the last block of pixels in the first group is known before the second encoding unit begins the encoding process on the second group, allowing the first block of pixels in the second group to have its dependent characteristic encoding value determined with reference to the characteristic encoding value for the block of pixels which precedes it (namely the last block in the first group).

In some embodiments, said first encoding unit is configured to perform said encoding process on a plurality of first groups of said unencoded blocks of pixels and said second encoding unit is configured to perform said encoding process on a plurality of second groups of said unencoded blocks of pixels, and wherein said pre-processing operation comprises determining respective characteristic encoding values for said last block of pixels in each of said plurality of first groups and said plurality of second groups, said pre-processing operation being performed before said first and second encoding units begin performance of said encoding process on said plurality of first groups and said plurality of second groups. Accordingly, when the first encoding unit is configured to perform the encoding process on a plurality of first groups and the second encoding unit is configured to perform the encoding process on a plurality of second groups, the pre-processing operation may be arranged to determine the respective characteristic encoding values for the last block of pixels in each of the plurality of the first groups and the plurality of the second groups. Hence, the image encoding apparatus can be, arranged to determine all of the characteristic encoding values which it will require for subsequent encoding of the plurality of first groups and plurality of second groups.

For example, in one such embodiment said plurality of first groups and said plurality of second groups are rows of blocks of pixels in a frame of said image data, and said pre-processing operation comprises determining respective characteristic encoding values for a last column of blocks of pixels in said frame. Accordingly, the image encoding apparatus is configured to handle the frame of image data on a row-by-row basis, and wherein an individual row of blocks of pixels in the frame is allocated to either the first encoding unit or to the second encoding unit to be encoded. For example, the first encoding unit might be allocated the odd-numbered rows in the frame, whilst the second encoding unit is allocated the even-numbered rows in the frame. In this situation, the last block of pixels in each row represents the block with reference to which the first block of pixels in the next row is encoded, specifically the dependent characteristic encoding value of the first block of each row being dependent on the characteristic encoding value of the last block of pixels of the previous row (where a previous row exists). Thus, the pre-processing operation in this example comprises determining the respective characteristic encoding values for the last block of pixels in each row of the frame, i.e. the last column of blocks of pixels in the frame. It should be noted that it may not be necessary to determine the characteristic encoding value for the last block of pixels in this last column (i.e. the last block of pixels in the last row of the frame), since a subsequent block of pixels dependent thereon will typically not exist.

Whilst the pre-processing operation may be carried out to determine a number of characteristic encoding values (such as for the last column of blocks of pixels in a frame as mentioned above), in one embodiment said image encoding apparatus is configured to perform said pre-processing operation immediately prior to said second encoding unit performing said encoding process on said second group. Accordingly, the pre-processing operation is performed "on-the-fly", and only the characteristic encoding value required for determining the dependent characteristic encoding value of the second group about to be encoded is determined in the pre-processing operation. In other words, the pre-processing operation may be carried out iteratively, for each first and second group of unencoded blocks of pixels which are to be encoded.

Whilst the image encoding apparatus could be arranged to perform the characteristic encoding value determination operation using a dedicated hardware unit, in one embodiment said image encoding apparatus is configured to perform said characteristic encoding value determination operation by causing said encoding process to be performed on said last block of pixels in said first group. Since the encoding process, for which the first and second encoding units are provided, already includes the determination of characteristic encoding values (whether dependent or not) this facility can be reused to determine the required characteristic encoding value in the characteristic encoding value determination operation.

In such an embodiment, given that the encoding process typically comprises several more steps than only the determination of the characteristic encoding value, in one such embodiment said image encoding apparatus is configured to terminate said encoding process on said last block of pixels in said first group once said characteristic encoding value for a last block of pixels in said first group has been determined. Accordingly, the characteristic encoding value determination operation may be made more power and time efficient by not carrying out those aspects of the encoding process which are not required.

The pre-processing operation may be performed in a number of ways, and in one embodiment said pre-processing operation is performed by said first encoding unit. As such, the first encoding unit may have an additional role to play over the second encoding unit in the image encoding apparatus, namely the performance of the pre-processing operation. However, the first and second encoding units may be more equally arranged and in some embodiments said pre-processing operation is distributed and performed in parallel by said first encoding unit and said second encoding unit.

In one embodiment said characteristic encoding value determination operation is performed as a post-processing operation in which said dependent characteristic encoding value for said first block of said second group is determined after said first encoding unit has performed said encoding process on said first group. Thus, the image encoding apparatus may be arranged to delay the determination of the dependent characteristic encoding value for the first block of the second group until after the first encoding unit has performed the encoding process on the first group. In other words, the first encoding unit and second encoding unit perform the encoding process on the first group and second group respectively, with the dependent characteristic encoding value for the first block of the second group remaining undetermined, and at a later stage the post-processing operation determines the dependent characteristic encoding value for the first block of the second group. For example, the data size reduction which can be achieved by encoding the first block of the second group using a dependent characteristic encoding value is temporarily neglected, to later be regained in this post-processing operation.

In one such embodiment, said second encoding unit is configured, in said encoding process, to output said first block of said second group encoded in said predetermined image encoding format using an independent characteristic encoding value, and wherein said independent characteristic encoding value is rewritten with said dependent characteristic encoding value for said first block of said second group in said post-processing operation. Hence, the second encoding unit is configured to treat the first block of the second group as though it cannot be encoded with reference to a preceding block (as would be the case for the very first block in a frame of image data, or the first block after a "restart" symbol) and to encode that block using an independent characteristic encoding value. The post-processing operation then comprises revisiting the encoding of the first block of the second group and rewriting the independent characteristic encoding value with the dependent characteristic encoding value with reference to the characteristic encoding value of the last block of the first group, which by this point is now available.

In an alternative embodiment, the second encoding unit is configured, in said encoding process, to output said first block of said second group encoded in said predetermined image encoding format without said dependent characteristic encoding value, and to store an independent characteristic encoding value for said first block of said second group in a local storage unit, wherein said dependent characteristic encoding value for said first block of said second group is written in said post-processing operation with reference to said independent characteristic encoding value stored in said local storage unit. Accordingly, the second encoding unit may be configured to output the first block of the second group without its dependent characteristic encoding value. For example, depending on the relevant constraints of the image encoding apparatus and the predetermined image encoding format, the encoded first block of the second group could be output without any characteristic encoding value or it could be output with a dummy characteristic encoding value. Meanwhile, the independent characteristic encoding value for this first block of the second group, which must be determined to enable the second encoding unit to perform the remainder of the encoding of this block, is stored in a local storage unit (e.g. in an internal memory or register of the image encoding apparatus). In the post-processing operation, the dependent characteristic encoding value for the first block of the second group is determined with reference to the stored independent characteristic encoding value and appropriately written within the other information of the encoded block.

In one embodiment the first encoding unit is configured to perform said encoding process on a plurality of first groups of said unencoded blocks of pixels and said second encoding unit is configured to perform said encoding process on a plurality of second groups of said unencoded blocks of pixels. It should be appreciated that whilst the plurality of first groups of the unencoded blocks of pixels which the first encoding unit is configured to encode may be defined by the particular configuration of the image data (e.g. the first groups could be rows of a frame), the sequential nature of the encoding of the image data (e.g. the raster scan sequence) mean that the first groups handled by the first encoding unit and the second groups handled by the second encoding unit can in principle be arbitrarily defined.

However, in one embodiment said first group and said second group are consecutive rows of a frame of said image data.

In some embodiments it may be arranged that the allocation of a group of unencoded blocks of pixels to each encoding unit may be dependent on the current performance of each encoding unit and accordingly, in one embodiment, said first group and said second group are selected by said image encoding apparatus in dependence on a current performance of said first encoding unit and said second encoding unit. For example, if the first encoding unit were to be allocated a first group which turned out to require significantly more processing time than the second group allocated to the second encoding unit, when the second encoding unit finishes the second group it could be allocated its next group to encode as those blocks of unencoded pixels which otherwise might have been encoded by the first encoding unit were it not still occupied with its previous allocation of blocks to encode.

In one embodiment the image encoding apparatus further comprises a stitch engine configured to perform a bit-wise copying operation to re-copy output of said first encoding unit and said second encoding unit into a single consecutive bitstream in said predetermined image encoding format. The arbitrary length of an encoded block of pixels in the predetermined image encoding format may mean that the output of the first encoding unit and the second encoding unit cannot easily be combined into a single sequence of encoded blocks of pixels, since it is not guaranteed that the end of the output of the first encoding unit will fall on a memory operation boundary (e.g. a byte or word boundary, depending on how the system is set up), meaning that normal memory copy operations cannot be used to combine the two. Accordingly, the image encoding apparatus may be provided with a stitch engine which is configured to perform a bit-wise copying operation. This bit-wise copying operation re-copies the output of the first encoding unit and the second encoding unit at the bit-level (rather than at the byte level at which most reading and writing operations are carried out) into a single consecutive bitstream.

The stitch engine could be configured to perform its bit-wise copying operation as a bulk operation after several first groups and second groups of unencoded blocks of pixels have been encoded by the first and second encoding units, but in one embodiment said stitch engine is configured to perform said bit-wise copying operation on a first result of said encoding process on said first group and a second result of said encoding process on said second group as soon as said first result and said second result are available. In other words, the operation of the stitch engine is integrated with the operation of the encoding units such that as soon as two groups of unencoded blocks of pixels have been encoded and output by the encoding units, these results are stitched together into the single consecutive bitstream.

The predetermined image encoding format and characteristic encoding value could take a number of forms, but in one embodiment said predetermined image encoding format is a JPEG format and said characteristic encoding value is a DC coefficient.

Viewed from a second aspect the present invention provides an image encoding apparatus configured to encode image data comprising a sequence of unencoded blocks of pixels into a sequence of encoded blocks of pixels in a predetermined image encoding format, wherein each encoded block of pixels has a characteristic encoding value representative of its corresponding unencoded block of pixels, and wherein a plurality of dependently encoded blocks of pixels in said sequence each have a dependent characteristic encoding value which is defined with reference to the characteristic encoding value for a preceding encoded block of pixels, the image encoding apparatus comprising: first encoding means for performing an encoding process on a first group of said unencoded blocks of pixels and second encoding means for performing said encoding process on a second group of said unencoded blocks of pixels, wherein said encoding process generates an encoded block of pixels in said predetermined image encoding format, wherein said second group immediately follows said first group and a first block of said second group is comprised in said plurality of dependently encoded blocks of pixels, wherein said first encoding means and said second encoding means are configured to perform said encoding process in parallel on respective unencoded blocks of pixels in said first group and in said second group on a block-by-block basis, and wherein said image encoding apparatus is configured to perform a characteristic encoding value determination operation to determine said characteristic encoding value for a last block of pixels in said first group, before determining said dependent characteristic encoding value for said first block of said second group.

Viewed from a third aspect the present invention provides an image encoding method for encoding image data comprising a sequence of unencoded blocks of pixels into a sequence of encoded blocks of pixels in a predetermined image encoding format, wherein each encoded block of pixels has a characteristic encoding value representative of its corresponding unencoded block of pixels, and wherein a plurality of dependently encoded blocks of pixels in said sequence each have a dependent characteristic encoding value which is defined with reference to the characteristic encoding value for a preceding encoded block of pixels, the image encoding method comprising the steps of: a first step of performing an encoding process on a first group of said unencoded blocks of pixels; a second step of performing said encoding process on a second group of said unencoded blocks of pixels, wherein said encoding process generates an encoded block of pixels in said predetermined image encoding format, wherein said second group immediately follows said first group and a first block of said second group is comprised in said plurality of dependently encoded blocks of pixels, wherein said first step and said second step are performed in parallel on a respective unencoded blocks of pixels in said first group and in said second group on a block-by-block basis; and performing a characteristic encoding value determination operation to determine said characteristic encoding value for a last block of pixels in said first group, before determining said dependent characteristic encoding value for said first block of said second group.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
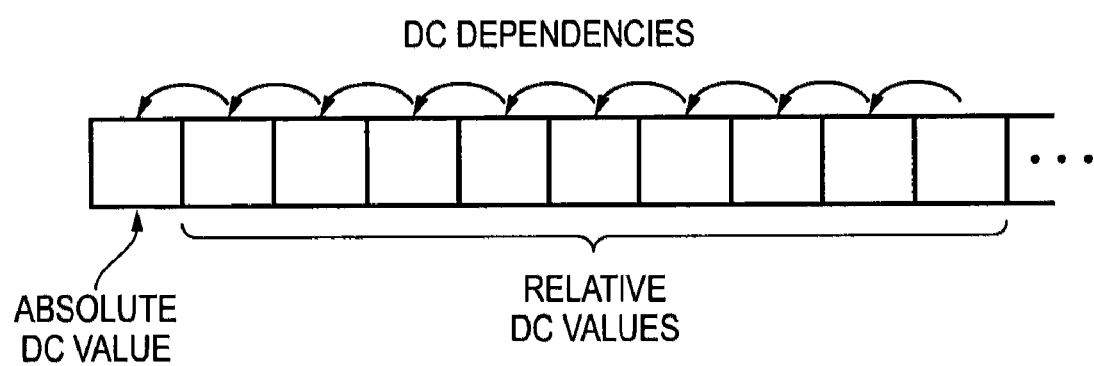
FIG. 1 schematically illustrates a known sequence of encoded blocks of pixels in JPEG format wherein many blocks are encoded using relative DC values.

FIG. 1 schematically illustrates a sequence of encoded blocks of pixels in a predetermined image encoding format such as one of the JPEG formats. The first block of pixels in the sequence is independently encoded and its characteristic encoding value (DC) is encoded in absolute terms. The following blocks of pixels however are each encoded with reference to the preceding block of pixels, wherein the characteristic encoding value for each block of pixels is dependently encoded, each characteristic encoding value (DC value) being encoded as a relative value referring to the previous characteristic encoding value. An entire frame of image data can be encoded as such a sequence, with the sequence of blocks following the familiar raster scan pattern through the frame. The sequential nature of the DC dependencies schematically illustrated in FIG. 1 demonstrates a difficulty for the parallelization of the encoding task, because in order to encode any given dependently encoded block of pixels, in principle each of the preceding blocks of pixels must have been previously encoded.

Figure 2:
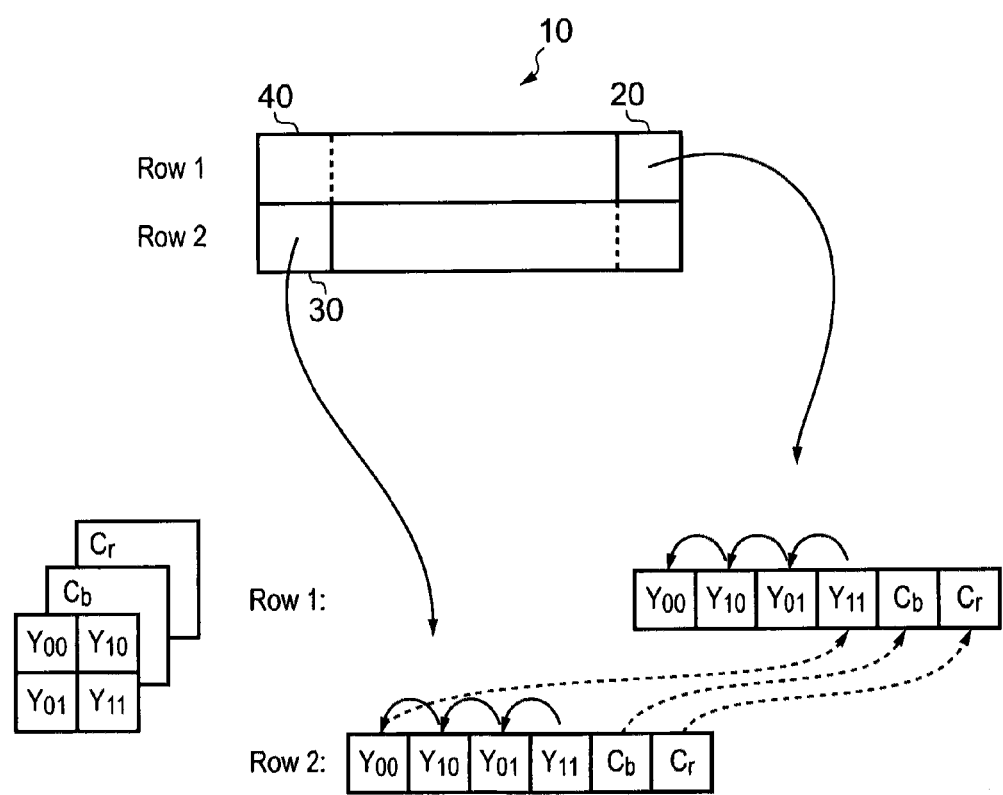
FIG. 2 schematically illustrates how two rows of an image may be allocated to parallel encoders by determining an independent characteristic encoding value for a last block of pixels in the first row.

FIG. 2 schematically illustrates two rows 10 of a frame of image data. As will be familiar to the person skilled in the art, the encoding of a given block of pixels will commonly be performed as an encoding in terms of three channels ($YC_bC_r$) wherein the luminance component Y is sampled at twice the linear resolution of the chrominance components. Hence, for the last block of pixels 20 in the first row and the first block of pixels 30 in the second row, a set of dependencies between the encoded luminance and chrominance values for these blocks will exist as illustrated by the arrows (full and dashed) in the lower part of FIG. 2. The dependencies (clashed arrows) from the first block 30 in the second row to the last block 20 in the first row mean that if block 30 is to be dependently encoded (with the consequent reduction in data size of the final encoded image that this would bring), the encoding of the block 20 must previously have been carried out. However, since it is desired that block 20 itself is a dependently encoded block, the chain of dependencies leads all the way back to the first block of pixels 40 in the first row. The inventors of the present invention however realised that these dependencies need not prevent the parallelization of the encoding of the first and second row. This is achieved in the illustrated example where the image data is to be encoded according to the JPEG encoding format, by performing a DC coefficient determination operation on block 20 before determining the relative DC coefficient for block 30.

In the embodiment contemplated in FIG. 2 this DC coefficient determination operation is performed as a pre-processing step wherein the image encoding apparatus first determines an absolute DC coefficient for block 20 before initiating the main encoding process carried out by two encoding units, one encoding unit handling row 1 and the other encoding unit handling row 2. Because an absolute DC coefficient value for block 20 is already available, the encoding unit which encodes block 30 can encode block 30 using a relative DC value (relative to the absolute DC coefficient for block 20). Meanwhile, the other encoding unit that handles row 1 begins at block 40 which, if this is the first block in this frame, will be encoded using an absolute DC coefficient. If block 40 is not the first block then it too will be encoded relative to a preceding block and the required absolute DC coefficient for the last block of the preceding row can also have been determined as part of the same pre-processing operation. However, in another embodiment the determination of the relative DC coefficient for block 30 may be carried out in a post-processing operation, so that the main encoding process in which row one and row two are encoded in parallel with one another by two encoding units comprises encoding block 30 with an absolute DC coefficient (thus enabling the remainder of row two to be encoded in dependence thereon). The post-processing operation then makes use of the DC coefficient for block 20 (as the last stage of the parallel encoding process) to then determine a relative DC coefficient for block 30. The absolute DC coefficient for block 30 calculated during the parallelized encoding process may be written out as part of the encoding of this block and then rewritten as a relative DC coefficient during the post-processing operation. Alternatively, during the parallelized encoding process, the absolute DC coefficient for block 30 is omitted from the encoding of this block (for example with some appropriate dummy values written in its place) to then be rewritten with the relative DC coefficient in the post-processing operation. More detail of the pre-processing and post-processing alternatives are discussed in more detail below.

Figure 3A:
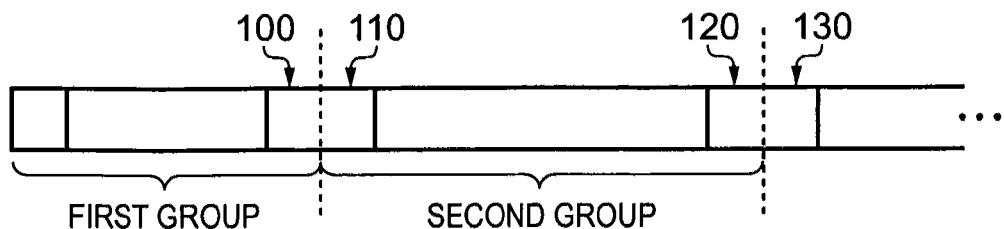
FIG. 3A schematically illustrates how a sequence of unencoded blocks of pixels may be sub-divided for parallel encoding by two or more encoding units.

FIG. 3A schematically illustrates the sub-division of a sequence of unencoded blocks of pixels for allocation to multiple encoding units which will operate in parallel with one another. Although the sub-division of blocks of pixels to be encoded may conveniently be performed on the basis of rows of blocks of pixels in a frame of image data, it is not necessary to parallelize the encoding process in this manner. The dashed lines in FIG. 3A illustrate arbitrary boundaries between blocks of pixels at which the sequence of unencoded blocks of pixels may be arbitrarily subdivided into a first group and second group (and further groups) of unencoded blocks of pixels for allocation to the encoding units. It is sufficient if the characteristic encoding value determination operation determines the characteristic encoding value for block 100 before the dependent characteristic encoding value for block 110 is determined. Similarly, the characteristic encoding value determination operation will determine the characteristic encoding value for block 120 before the dependent characteristic encoding value for block 130 is determined. It should be noted that block 130 may represent the first block of pixels in another "first group", i.e. to be encoded by the encoding unit which encodes the first group shown in FIG. 3A, but alternatively block 130 may be the first block of a further group which is allocated to a third encoding unit which operates in parallel to the first and second encoding units.

Figure 3B:
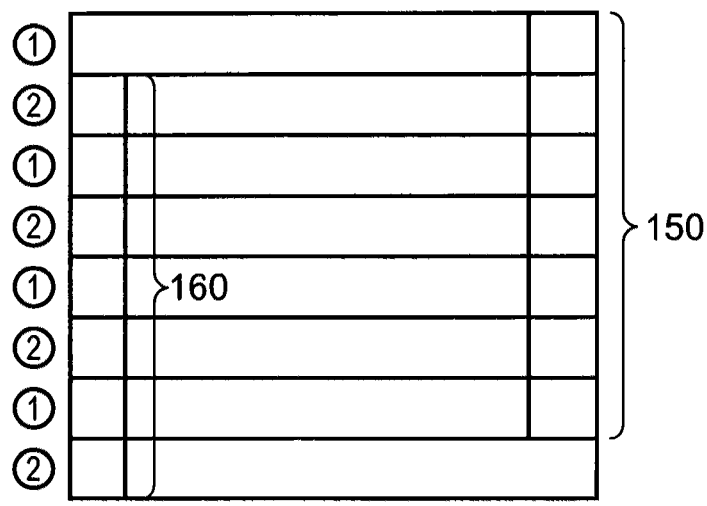
FIG. 3B schematically illustrates how a frame of image data may be allocated between two encoding units and the particular blocks of pixels where the dependencies must be broken in order to allow parallel operation of the two encoding units.

FIG. 3B schematically illustrates how the rows of a frame of unencoded image data may be allocated between two encoding units wherein the encoding units are allocated alternate rows of the frame. Furthermore, FIG. 3B illustrates the set of last blocks of pixels in each row 150 for which the characteristic encoding value determination operation will be carried out in order to allow the dependent encoding of the set of first block of pixels 160. Note that the set of last blocks of pixels 150 does not include the last block of pixels in the last row, since there is no following block of pixels to be encoded in dependence thereon. Equally note that the set of first blocks of pixels 160 does not include the first block of pixels in the first row since this block is not preceded by another block of pixels and will be independently encoded. When handling a frame of image data such as that schematically illustrated in FIG. 3B, the two encoding units may be configured to perform a pre-processing operation wherein the characteristic encoding value for each of the blocks of pixels in this set 150 is determined. In another embodiment, the pre-processing operation is performed on-the-fly, as a step preceding each pair of rows being encoded by the two encoding units. Typically the two encoding units are configured to share this pre-processing operation, however, in an alternative embodiment the pre-processing operation may be performed by a selected one of the two encoding units.

Figure 3C:
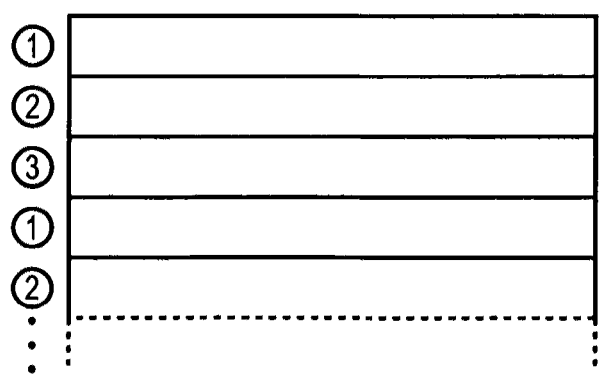
FIG. 3C schematically illustrates how rows of a frame of image data may be allocated to three encoding units.

FIG. 3C schematically illustrates how the rows of a frame of unencoded image data may be handled by three encoding units. In principle any such permutation is possible, indeed full parallelization of the encoding of a frame of image data could be achieved by providing one encoding unit for each row of the image data. In the examples shown in FIGS. 3B and 3C the rows of the frames are allocated to the encoding units in a repeating, alternating pattern. However the image encoding apparatus can also be configured to allocate each row in dependence on the availability of the encoding units. Hence the strict alternating allocating need not be followed.

Figure 4:
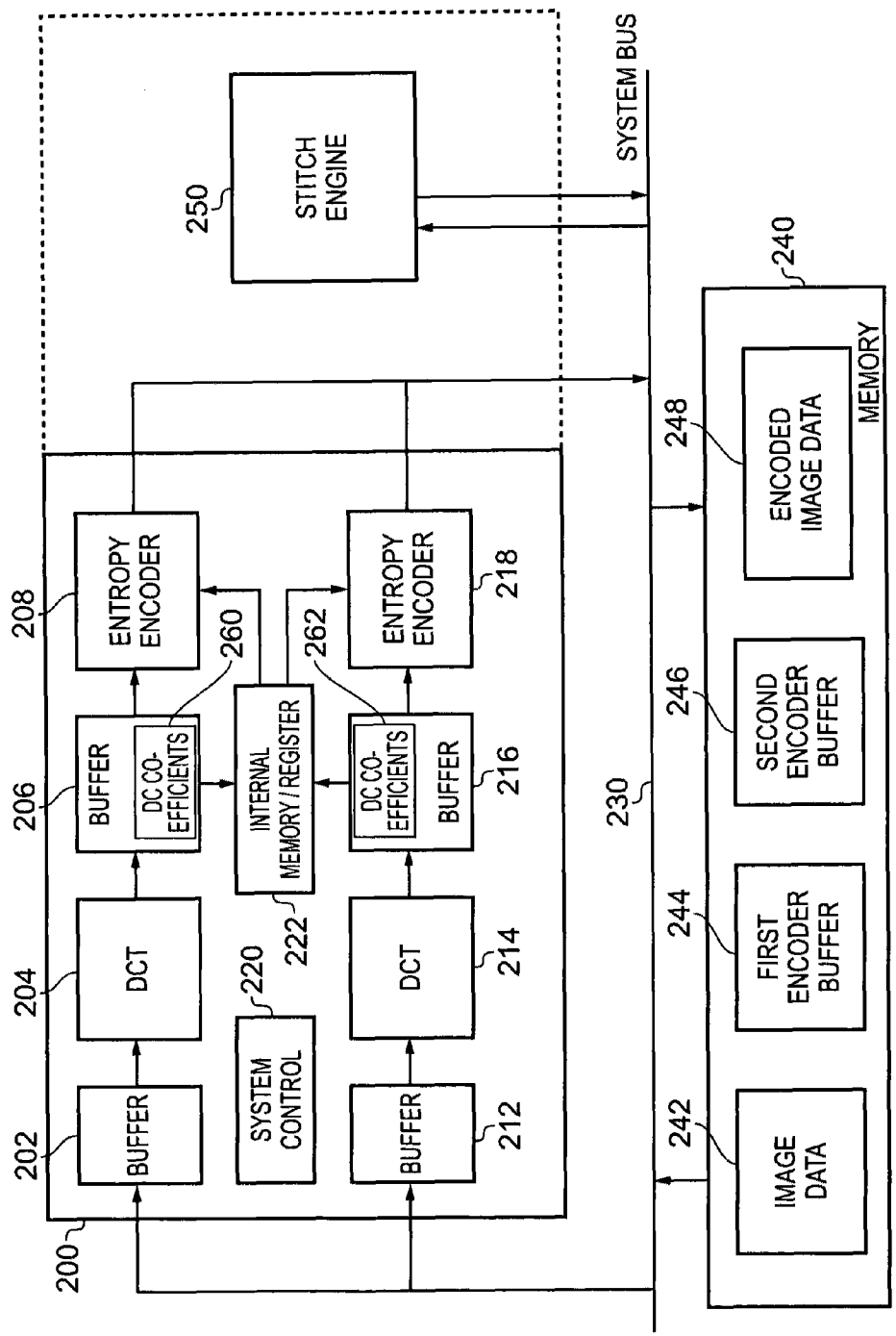
FIG. 4 schematically illustrates an image encoding apparatus according to one embodiment.

FIG. 4 schematically illustrates an image encoding apparatus according to one embodiment. The image encoding apparatus 200 is configured to perform parallel JPEG encoding on two groups of unencoded blocks of pixels which it receives. The image encoding apparatus 200 comprises a first encoding unit and a second encoding unit. The first encoding unit is schematically represented by buffer 202, discrete cosine transform unit 204, buffer 206 and entropy encoder 208. Similarly, the second encoding unit is schematically represented by buffer 212, discrete cosine transform unit 214, buffer 216 and entropy encoder 218. It will be appreciated that each encoding unit is only illustrated at a schematic level for clarity of illustration, the person skilled in the art being familiar with the detailed configuration of a JPEG encoding unit. The image encoding apparatus 200 also comprises a system control unit 220 which coordinates the operation of the apparatus and an internal memory 222 which may be provided by a small RAM or one or more registers depending on the particular manner in which the image encoding apparatus is configured to be operated, as is discussed in more detail below.

The image encoding apparatus 200 is connected via a system bus 230 to a memory 240. The memory 240 contains an image data buffer 242 in which a sequence of unencoded blocks of pixels is stored ready to be encoded by the image encoding apparatus 200. The image encoding apparatus 200 retrieves unencoded blocks of pixels from image data buffer 242 and temporarily stores them in buffers 202 and 212. In one embodiment, the image encoding apparatus 200 is configured to encode image data on a row-by-row basis and alternate rows of image data to be encoded are stored in buffers 202 and 212 respectively. Each encoding unit is configured as a pipeline. Thus a block of pixels to be encoded is passed from buffer 202 into DCT unit 204; then the result of the DCT operation performed in DCT unit 204 is stored in buffer 206 for each block of pixels; whereafter entropy encoding is performed by entropy encoder 208. Each encoded block of pixels is generated by the first encoding unit (202; 204; 206; 208) on this block-by-block basis and is written to the first encoder buffer 244 in memory 240. A similar encoding process on a block-by-block basis is carried out by the second encoding unit (212; 214; 216; 218) and an encoded block of pixels generated by the second encoding unit is written into the second encoding buffer 246 in memory 240.

The output of the two encoding units stored in the first encoder buffer 244 and the second encoder buffer 246 are concatenated into a single consecutive bitstream by the stitch engine 250. Stitch engine 250 may form a part of the image encoding apparatus 200 as illustrated by the dashed line. The final single consecutive bitstream is then stored in the encoded image data buffer 248 in memory 240. The operation of stitch engine 250 is discussed in more detail below with reference to FIG. 6.

One product of the DCT operations carried out by DCT units 204 and 214 is the DC coefficient for each block of pixels being encoded. These DC coefficients 260, 262 can be stored in the internal memory/register 222 to be used by the entropy encoders 208, 218. This is described in more detail below.

Figure 5:
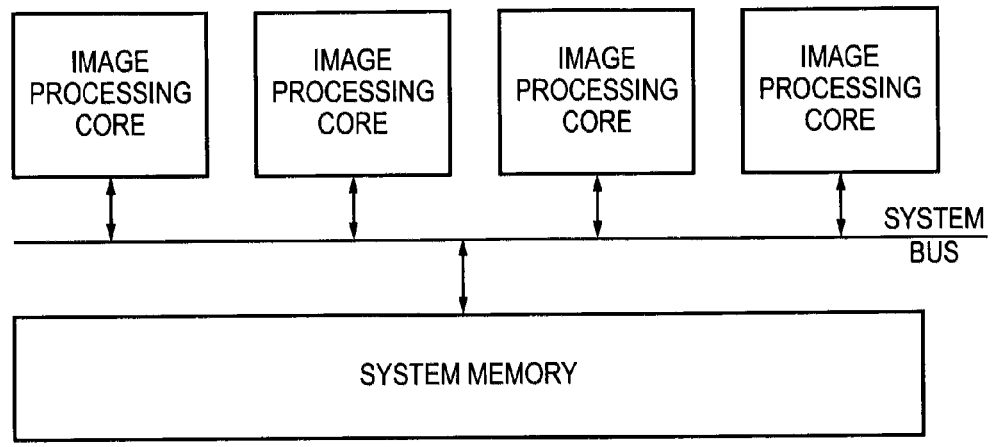
FIG. 5 schematically illustrates a multi-core image encoding apparatus according to one embodiment.

FIG. 5 schematically illustrates an embodiment in which the image encoding apparatus comprises multiple image processing cores connected together, and to a common system memory, by a system bus. Each image processing core comprises at least one encoding unit such that the parallelization of the encoding process may be carried out not only within one image processing core but across multiple image processing cores.

Figure 6:
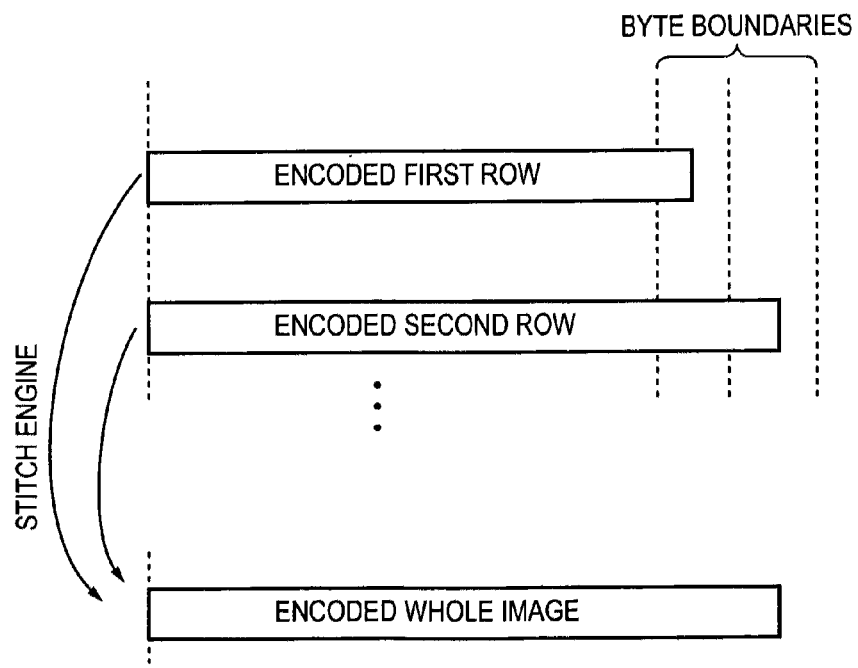
FIG. 6 schematically illustrates how two rows of a frame of image data encoded in parallel are concatenated by a stitch engine in one embodiment.

FIG. 6 schematically illustrates the operation of the stitch engine 250 shown in FIG. 4. The first and second encoding units in FIG. 4 are configured to encode alternate rows of a frame of image data. Hence, the encoded first row is stored in first encoder buffer 244 whilst the encoded second row is stored in the second encoder buffer 246. However, given that each encoded block of pixels may be of arbitrary length, the encoded first row and/or encoded second row stored in the memory may not end at a byte boundary. This means that in order for the first and second row to be concatenated into a single bitstream, normal memory copy operations within memory 240 cannot be used because these must be performed in units of whole bytes. However, the stitch engine 250 is configured to be able to perform a bit-wise copying operation to append the encoded second row directly onto the end of the encoded first row. Thus, the stitch engine builds up the encoded whole image from the encoded rows stored by the first and second encoding unit in the first and second encoder buffers. Whilst the stitch engine could be configured to concatenate all encoded rows in one final stitching step, the stitch engine 250 schematically illustrated in FIG. 4 is integrated with the pipelined nature of the two encoding units, performing its stitching operation as each encoded row is written to its respective encoder buffer in memory.

Figure 7:
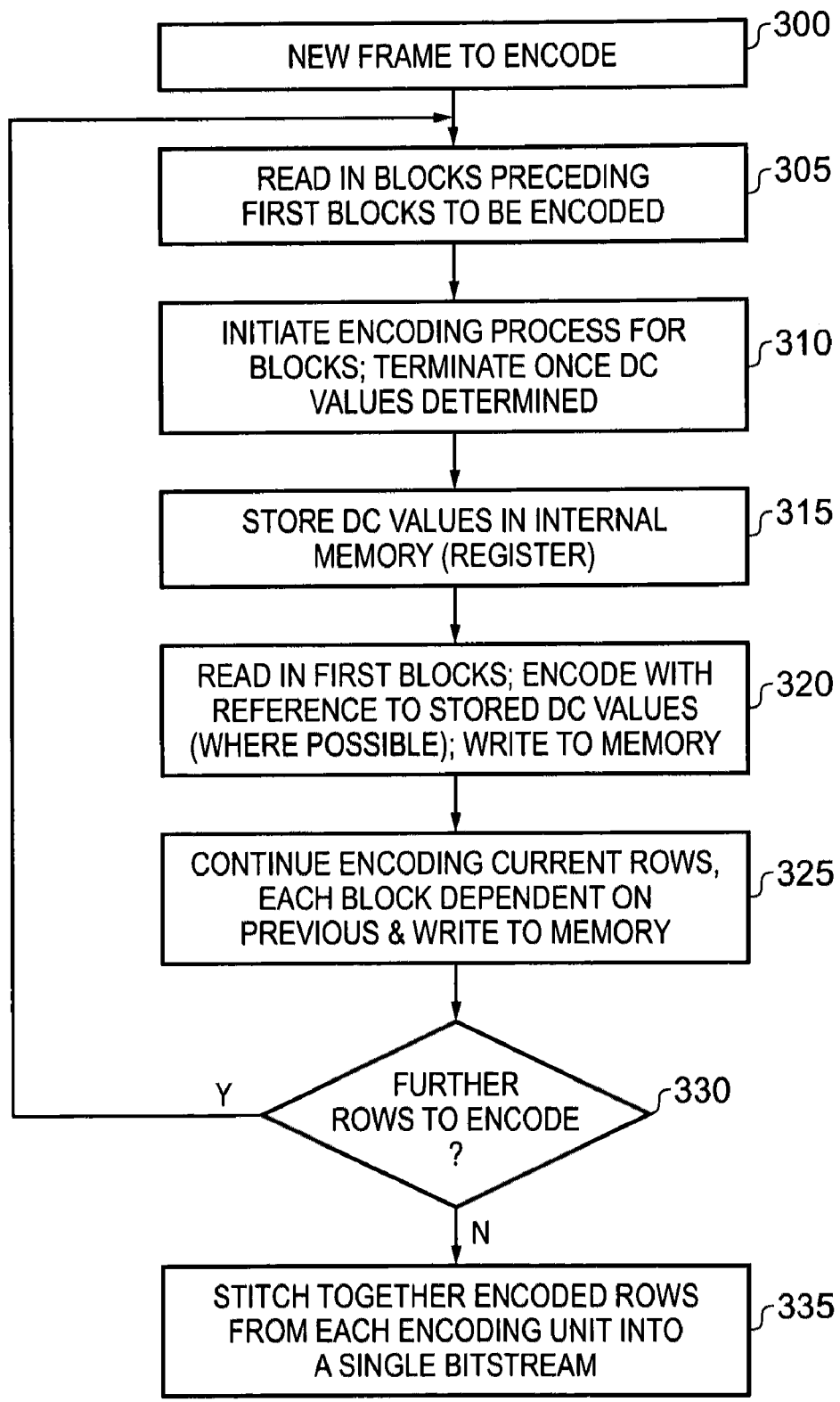
FIG. 7 schematically illustrates a series of steps taken in an image encoding apparatus in one embodiment.

FIG. 7 schematically illustrates a series of steps performed by an image encoding apparatus in one embodiment. At step 300 a new frame is available in the image data buffer in memory to be encoded. In this embodiment the image encoding apparatus performs JPEG encoding and is configured to perform its characteristic encoding value determination operation on-the-fly, preceding the parallel encoding of a pair of rows of blocks of pixels with a pre-processing operation in which the DC coefficients for the blocks which precede the first blocks in each row (i.e. the last block in the preceding rows) are first calculated.

In terms of the steps performed the flow proceeds via step 305 where the blocks preceding the first blocks encoded are read in from memory. Then at step 310, the encoding units of the image encoding apparatus begin the encoding process for these blocks of pixels. The system control 220 (FIG. 4) causes the encoding process to be terminated once the DC coefficient for each block of pixels has been determined. At step 315 these DC values are stored in the internal memory/register 222. Then at step 320 the main encoding process begins wherein the first blocks of each row are read in, these being dependently encoded with reference to the stored DC values. Note that for a block which does not have a preceding block (the first block in an image) this will not be possible and the block will be encoded independently. The first encoded blocks are written to memory and at step 325 each encoding unit continues with the next block in its respective row, encoding this block dependent on the previous block and writing it out to memory. It should be noted that although for clarity of discussion these steps 320 and 325 are described separately, in practice since the encoding units are arranged in a pipeline fashion each encoding unit can begin the encoding of a next block before the preceding block has exited the pipeline. At step 330 it is determined if there are further rows to be encoded and if there are, the flow returns to step 305. If there are not, then at step 335 the stitch engine stitches together the encoded rows from each encoding unit into a single bitstream. Again, note that step 335 is described separately here for clarity of discussion only and as described above will typically be implemented as a process integrated into the pipeline behaviour of the image encoding apparatus, encoded rows being stitched together as soon as they are available.

Figure 8:
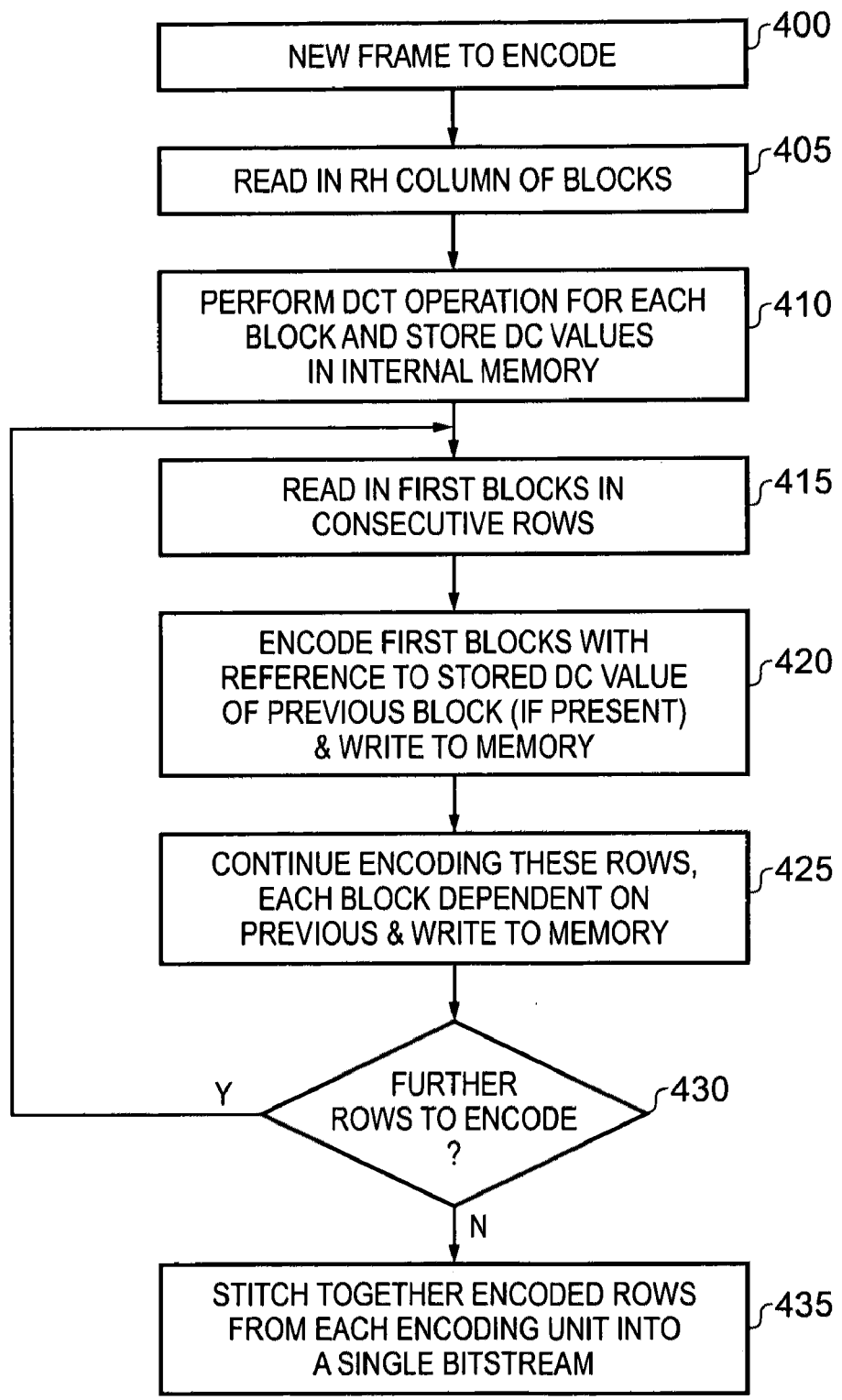
FIG. 8 schematically illustrates a series of steps taken by an image encoding apparatus in one embodiment.

FIG. 8 schematically illustrates a series of steps performed by an image encoding apparatus in another embodiment. At step 400 a new frame is available in the image data buffer in memory to be encoded. In this embodiment the image encoding apparatus performs JPEG encoding and is configured to carry out a pre-processing operation in which the characteristic encoding value determination operation determines the DC coefficients for each of the last blocks in a pre-processing step.

At step 405 the right-hand column of blocks from the frame being encoded is read in and at step 410 the DCT operation is performed for each block with each DCT value being stored in the internal memory of the image encoding apparatus. As before this will typically be carried out by initiating the encoding process in one of the encoding units but terminating once the DC coefficient has been determined. Note that steps 405 and 410 will typically be interleaved, wherein a block is read in for each encoding unit and the DCT operation performed in a pipelined fashion. Once the pre-processing operation of determining the DC coefficient required to set up the parallel encoding, the flow proceeds to step 415 where the first blocks of each row are read in and at step 420 these are dependently encoded with reference to the stored DC coefficients. As before, a block which does not have a preceding block will be encoded independently. The first encoded blocks are written to memory, and at step 425 the current rows continue to be encoded with each block being encoded dependently with respect to the previous block. Again, as mentioned above with reference to steps 320 and 325, it should be noted that although for clarity of discussion these steps 415, 420 and 425 are described separately, in practice since the encoding units are arranged in a pipeline fashion each encoding unit can begin the encoding of a next block before the preceding block has exited the pipeline. At step 430 it is determined if there are further rows in the frame to encode, and if there are the flow returns to step 415. If not then the flow proceeds to the final step 435 at which the stitch engine stitches together the encoded rows into a single bitstream. Again note that step 435 is described separately here for clarity of discussion only and as described above will typically be implemented as a process integrated into the pipeline behaviour of the image encoding apparatus, encoded rows being stitched together as soon as they are available.

Figure 9:
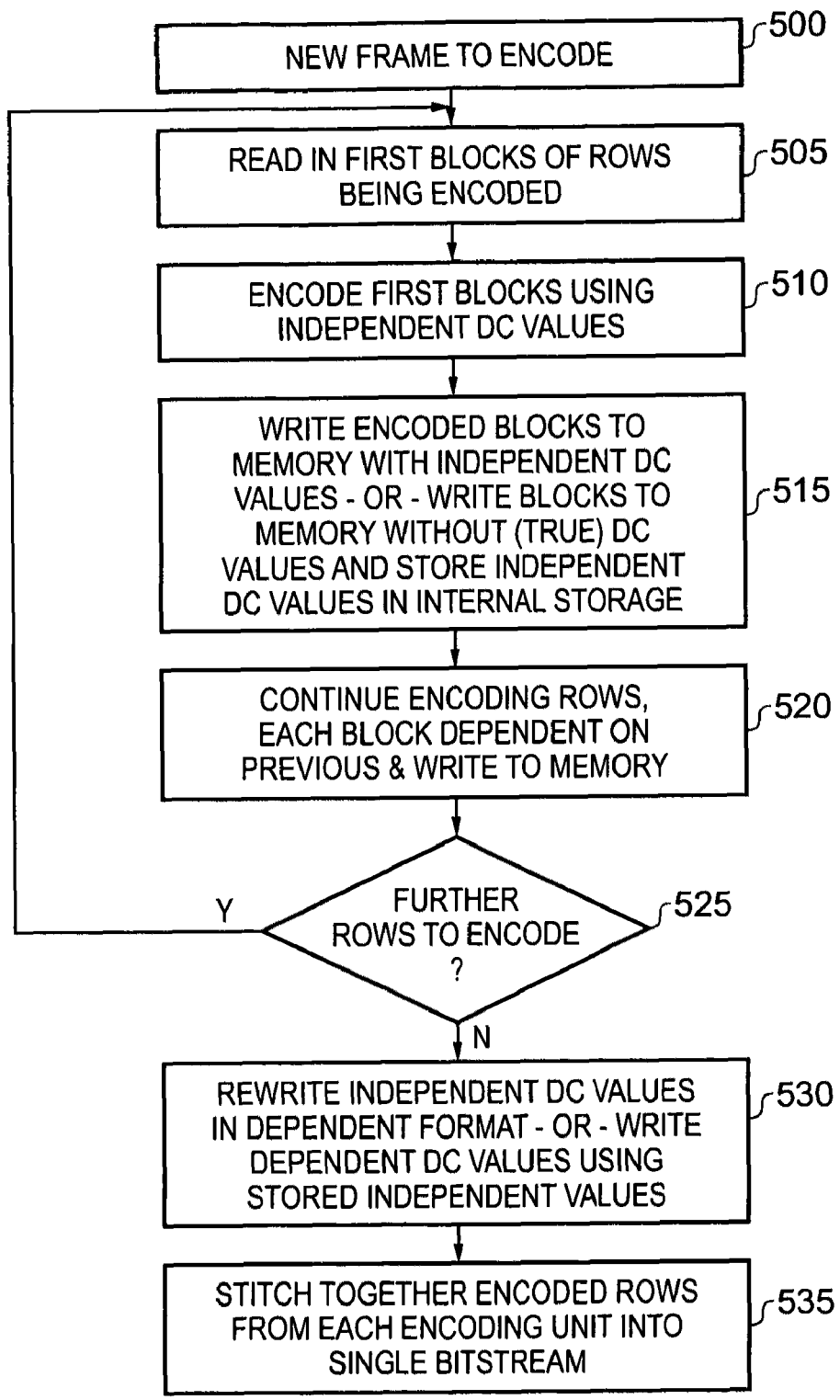
FIG. 9 schematically illustrates a series of steps taken by an image encoding apparatus in one embodiment.

FIG. 9 schematically illustrates a series of steps performed by an image encoding apparatus in one embodiment. At step 500 a new frame in available in the image buffer memory to be encoded. In this embodiment the image encoding apparatus performs JPEG encoding, and is configured to perform its characteristic encoding value determination operation as a post-processing step. Accordingly the flow proceeds first to step 505 at which the first blocks of each row to be encoded are read in. These blocks are encoded in parallel by the two encoding units (step 510) using independent (i.e. absolute) DC values, regardless of whether these blocks should in fact be dependently encoded (i.e. using relative DC values). The use of absolute DC values for these blocks only represents a temporary action to allow the parallelization of their encodings and step 515 represents two alternative approaches to handling these absolute DC values, such that if at least one of them should in fact be dependently encoded this can later be done. In one alternative the encoded blocks are written to memory with these independent DC values, i.e. with entirely normal absolute DC values. In the alternative, the blocks are written to memory without real DC values (this may be achieved by omitting this information or writing dummy information in its place), whilst storing the independent DC values (calculated by the DCT units) in the internal storage of the image encoding apparatus (e.g. in a register or internal memory). Then at step 520 the remainder of each row is encoded, each block being encoded in dependence on its preceding block and being written out to memory. At step 525 it is determined if there are further rows to be encoded in this frame and if there are, flow returns to step 505. If all rows have been completed then the flow proceeds to step 530 at which a post-processing operation is carried out, the precise format of which will depend on the variant carried out at step 515. In the first alternative the independent DC values that have been written for the first blocks in each row are (where possible) recalculated as dependent DC values with respect to the preceding block and are rewritten as such. In the alternative (where no DC value was written out) the dependent DC value is determined with respect to the preceding block using the absolute DC value stored in the internal storage. Note that step 530 is described separately for clarity of discussion here and this step may also be integrated into the pipeline behaviour of the image encoding apparatus wherein the post-processing step is performed for each encoded row as it becomes available. Indeed, this post-processing operation may be performed as soon as the relevant blocks are available. Finally at step 535 (in a similar fashion as described with reference to FIGS. 7 and 8), the stitch engine stitches together the encoded rows from each encoding unit to a single bitstream (and this may also be included in the pipeline behaviour).

Figure 10:
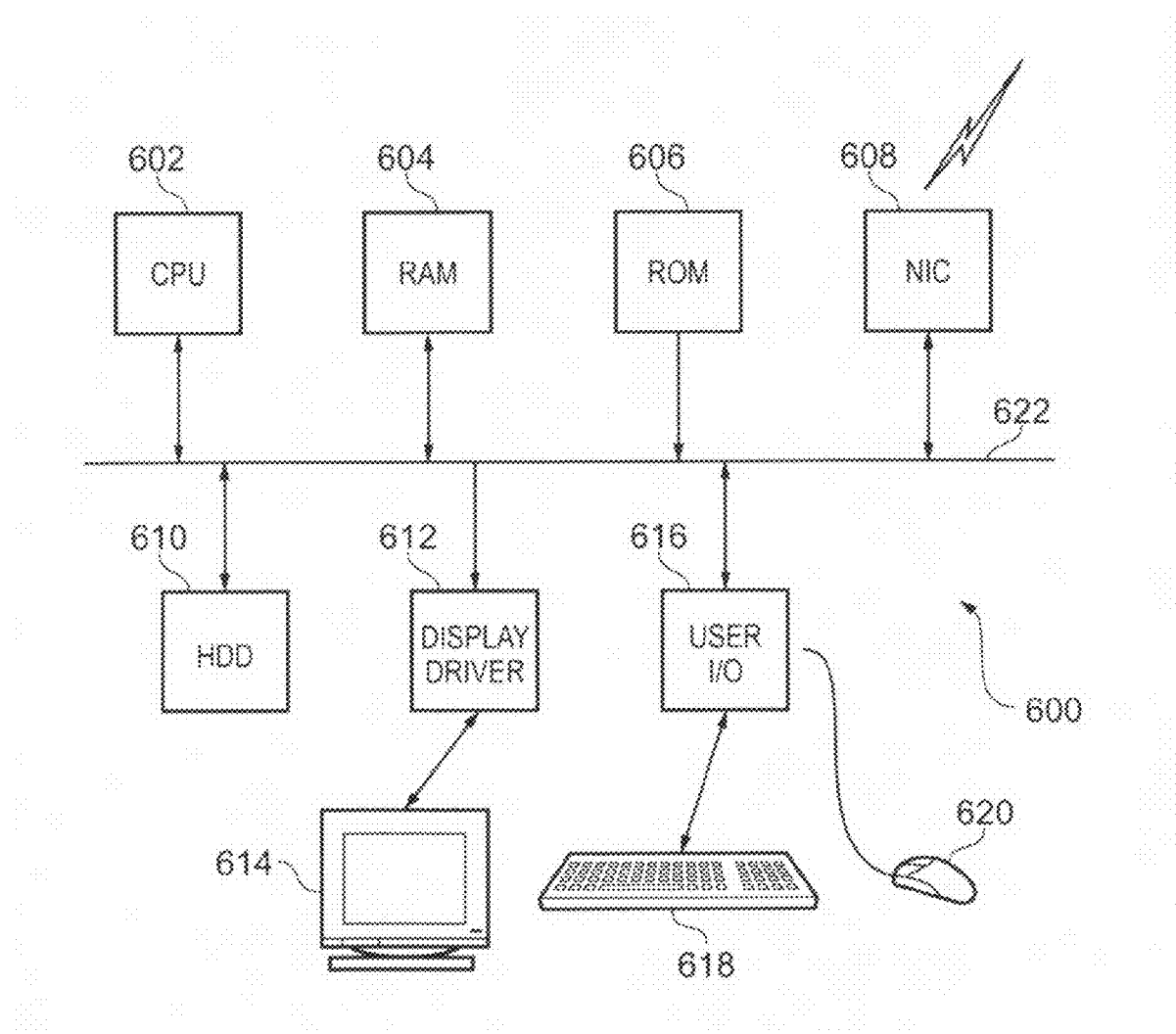
FIG. 10 schematically illustrates a general purpose computing device.

FIG. 10 schematically illustrates a general purpose computing device 600 of the type that may be used to implement the above described techniques. The general purpose computing device 600 includes a central processing unit 602, a random access memory 604 and a read only memory 606, connected together via bus 622. It also further comprises a network interface card 608, a hard disk drive 610, a display driver 612 and monitor 614 and a user input/output circuit 616 with a keyboard 618 and mouse 620 all connected via the common bus 622. In operation, such as when performing image encoding as described above, the central processing unit 602 will execute computer program instructions that may for example be stored in the random access memory 604 and/or the read only memory 606. Program instructions could be additionally retrieved from the hard disk drive 610 or dynamically downloaded via the network interface card 608. It will be appreciated that in order to carry out those aspects of the present invention which are performed in parallel with one another (such as the encoding process performed by the first and second encoding units), the central processing unit 602 may in fact comprise more than one processor core, such that multiple data processing operations can be carried out simultaneously. The results of the processing performed may be displayed to a user or an engineer via a connected display driver 612 and monitor 614. User inputs for controlling the operation of the general purpose computing device 600 may be received via a connected user input output circuit 616 from the keyboard 618 or the mouse 620. It will be appreciated that the computer program could be written in a variety of different computer languages. The computer program may be stored locally on a recording medium or dynamically downloaded to the general purpose computing device 600. When operating under control of an appropriate computer program, the general purpose computing device 600 can perform the above described techniques and can be considered to form an apparatus for performing the above described technique. The architecture of the general purpose computing device 600 could vary considerably and FIG. 10 is only one example.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. An image encoding apparatus configured to encode image data comprising a sequence of unencoded blocks of pixels into a sequence of encoded blocks of pixels in a predetermined image encoding format, wherein each encoded block of pixels has a characteristic encoding value representative of its corresponding unencoded block of pixels, and wherein a plurality of dependently encoded blocks of pixels in said sequence each have a dependent characteristic encoding value which is defined with reference to the characteristic encoding value for a preceding encoded block of pixels, the image encoding apparatus comprising:
a first encoding unit configured to perform an encoding process on a first group of said unencoded blocks of pixels and a second encoding unit configured to perform said encoding process on a second group of said unencoded blocks of pixels, wherein said encoding process generates an encoded block of pixels in said predetermined image encoding format, wherein said second group immediately follows said first group and a first block of said second group is comprised in said plurality of dependently encoded blocks of pixels,
wherein said first encoding unit and said second encoding unit are configured to perform said encoding process in parallel on respective unencoded blocks of pixels in said first group and in said second group on a block-by-block basis,
and wherein said image encoding apparatus is configured to perform a characteristic encoding value determination operation to determine said characteristic encoding value for a last block of pixels in said first group, before determining said dependent characteristic encoding value for said first block of said second group.

2. The image encoding apparatus as claimed in claim 1, wherein said first group is immediately preceded by a preceding group, and said image encoding apparatus is further configured to perform said characteristic encoding value determination operation to determine said characteristic encoding value for a last block of pixels in said preceding group, before determining said dependent characteristic encoding value for said first block of said first group.

3. The image encoding apparatus as claimed in claim 2, wherein said preceding group has previously been encoded by said second encoding unit.

4. The image encoding apparatus as claimed in claim 1, further comprising a further encoding unit configured to perform said encoding process on a further group of said unencoded blocks of pixels, wherein said further group immediately follows said second group, wherein said further encoding unit is configured to perform said encoding process on respective unencoded blocks of pixels in said further group in parallel with said first and second encoding units,
and wherein said image encoding apparatus is configured to perform said characteristic encoding value determination operation to determine said characteristic encoding value for a last block of pixels in said second group, before determining said dependent characteristic encoding value for said first block of said further group.

5. The image encoding apparatus as claimed in claim 1, wherein said first and second encoding unit are provided on a single processor core.

6. The image encoding apparatus as claimed in claim 1, wherein said first and second encoding unit are provided on separate processor cores in a multi-core system.

7. The image encoding apparatus as claimed in claim 1, wherein said characteristic encoding value determination operation is performed as a pre-processing operation in which said characteristic encoding value for said last block of pixels in said first group is determined, said pre-processing operation being performed before said second encoding unit begins said encoding process on said second group.

8. The image encoding apparatus as claimed in claim 7, wherein said first encoding unit is configured to perform said encoding process on a plurality of first groups of said unencoded blocks of pixels and said second encoding unit is configured to perform said encoding process on a plurality of second groups of said unencoded blocks of pixels,
and wherein said pre-processing operation comprises determining respective characteristic encoding values for said last block of pixels in each of said plurality of first groups and said plurality of second groups, said pre-processing operation being performed before said first and second encoding units begin performance of said encoding process on said plurality of first groups and said plurality of second groups.

9. The image encoding apparatus as claimed in claim 8, wherein said plurality of first groups and said plurality of second groups are rows of blocks of pixels in a frame of said image data,
and said pre-processing operation comprises determining respective characteristic encoding values for a last column of blocks of pixels in said frame.

10. The image encoding apparatus as claimed in claim 7, wherein said image encoding apparatus is configured to perform said pre-processing operation immediately prior to said second encoding unit performing said encoding process on said second group.

11. The image encoding apparatus as claimed in claim 7, wherein said image encoding apparatus is configured to perform said characteristic encoding value determination operation by causing said encoding process to be performed on said last block of pixels in said first group.

12. The image encoding apparatus as claimed in claim 11, wherein said image encoding apparatus is configured to terminate said encoding process on said last block of pixels in said first group once said characteristic encoding value for a last block of pixels in said first group has been determined.

13. The image encoding apparatus as claimed in claim 7, wherein said pre-processing operation is performed by said first encoding unit.

14. The image encoding apparatus as claimed in claim 7, wherein said pre-processing operation is distributed and performed in parallel by said first encoding unit and said second encoding unit.

15. The image encoding apparatus as claimed in claim 1, wherein said characteristic encoding value determination operation is performed as a post-processing operation in which said dependent characteristic encoding value for said first block of said second group is determined after said first encoding unit has performed said encoding process on said first group.

16. The image encoding apparatus as claimed in claim 15, wherein said second encoding unit is configured, in said encoding process, to output said first block of said second group encoded in said predetermined image encoding format using an independent characteristic encoding value, and wherein said independent characteristic encoding value is rewritten with said dependent characteristic encoding value for said first block of said second group in said post-processing operation.

17. The image encoding apparatus as claimed in claim 15, wherein said second encoding unit is configured, in said encoding process, to output said first block of said second group encoded in said predetermined image encoding format without said dependent characteristic encoding value, and to store an independent characteristic encoding value for said first block of said second group in a local storage unit,
wherein said dependent characteristic encoding value for said first block of said second group is written in said post-processing operation with reference to said independent characteristic encoding value stored in said local storage unit.

18. The image encoding apparatus as claimed in claim 1, wherein said first encoding unit is configured to perform said encoding process on a plurality of first groups of said unencoded blocks of pixels and said second encoding unit is configured to perform said encoding process on a plurality of second groups of said unencoded blocks of pixels.

19. The image encoding apparatus as claimed in claim 1, wherein said first group and said second group are consecutive rows of a frame of said image data.

20. The image encoding apparatus as claimed in claim 1, wherein said first group and said second group are selected by said image encoding apparatus in dependence on a current performance of said first encoding unit and said second encoding unit.

21. The image encoding apparatus as claimed in claim 1, further comprising a stitch engine configured to perform a bit-wise copying operation to re-copy output of said first encoding unit and said second encoding unit into a single consecutive bitstream in said predetermined image encoding format.

22. The image encoding apparatus as claimed in claim 21, wherein said stitch engine is configured to perform said bit-wise copying operation on a first result of said encoding process on said first group and a second result of said encoding process on said second group as soon as said first result and said second result are available.

23. The image encoding apparatus as claimed in claim 1, wherein said predetermined image encoding format is a JPEG format and said characteristic encoding value is a DC coefficient.

24. An image encoding apparatus configured to encode image data comprising a sequence of unencoded blocks of pixels into a sequence of encoded blocks of pixels in a predetermined image encoding format,
wherein each encoded block of pixels has a characteristic encoding value representative of its corresponding unencoded block of pixels, and wherein a plurality of dependently encoded blocks of pixels in said sequence each have a dependent characteristic encoding value which is defined with reference to the characteristic encoding value for a preceding encoded block of pixels, the image encoding apparatus comprising:
first encoding means for performing an encoding process on a first group of said unencoded blocks of pixels and second encoding means for performing said encoding process on a second group of said unencoded blocks of pixels, wherein said encoding process generates an encoded block of pixels in said predetermined image encoding format, wherein said second group immediately follows said first group and a first block of said second group is comprised in said plurality of dependently encoded blocks of pixels,
wherein said first encoding means and said second encoding means are configured to perform said encoding process in parallel on respective unencoded blocks of pixels in said first group and in said second group on a block-by-block basis,
and wherein said image encoding apparatus is configured to perform a characteristic encoding value determination operation to determine said characteristic encoding value for a last block of pixels in said first group, before determining said dependent characteristic encoding value for said first block of said second group.

25. An image encoding method for encoding image data comprising a sequence of unencoded blocks of pixels into a sequence of encoded blocks of pixels in a predetermined image encoding format,
wherein each encoded block of pixels has a characteristic encoding value representative of its corresponding unencoded block of pixels, and wherein a plurality of dependently encoded blocks of pixels in said sequence each have a dependent characteristic encoding value which is defined with reference to the characteristic encoding value for a preceding encoded block of pixels, the image encoding method comprising the steps of:
a first step of performing an encoding process on a first group of said unencoded blocks of pixels;
a second step of performing said encoding process on a second group of said unencoded blocks of pixels, wherein said encoding process generates an encoded block of pixels in said predetermined image encoding format,
wherein said second group immediately follows said first group and a first block of said second group is comprised in said plurality of dependently encoded blocks of pixels,
wherein said first step and said second step are performed in parallel on respective unencoded blocks of pixels in said first group and in said second group on a block-by-block basis; and
performing a characteristic encoding value determination operation to determine said characteristic encoding value for a last block of pixels in said first group, before determining said dependent characteristic encoding value for said first block of said second group.

* * * * *